(12) United States Patent
Egolf et al.

(10) Patent No.: US 8,895,464 B2
(45) Date of Patent: Nov. 25, 2014

(54) ROBUSTNESS OF COKE BURNING FROM CATALYST FOR LIGHT PARAFFIN DEHYDROGENATION PROCESS

(75) Inventors: Bryan J. Egolf, Crystal Lake, IL (US); Laura E. Leonard, Western Springs, IL (US); Michael Caracotsios, Naperville, IL (US)

(73) Assignee: UOP LLC, Des Plaines, IL (US)

( * ) Notice: Subject to any disclaimer, the term of this patent is extended or adjusted under 35 U.S.C. 154(b) by 116 days.

(21) Appl. No.: 13/424,911

(22) Filed: Mar. 20, 2012

(65) Prior Publication Data

US 2013/0252800 A1  Sep. 26, 2013

(51) Int. Cl.
*B01J 38/12* (2006.01)

(52) U.S. Cl.
USPC .............................................. 502/38; 502/35

(58) Field of Classification Search
USPC ..................................................... 502/35, 38
See application file for complete search history.

(56) References Cited

U.S. PATENT DOCUMENTS

| | | | |
|---|---|---|---|
| 4,783,566 A | 11/1988 | Kocal et al. | |
| 5,830,346 A * | 11/1998 | Harandi et al. | 208/113 |
| 6,048,814 A | 4/2000 | Capelle et al. | |
| 6,147,022 A * | 11/2000 | Brunet et al. | 502/45 |
| 6,632,765 B1 | 10/2003 | Chen | |
| 6,916,756 B2 | 7/2005 | Schindler et al. | |
| 7,585,803 B1 | 9/2009 | Price et al. | |

FOREIGN PATENT DOCUMENTS

RU  2159676 C1  11/2000

OTHER PUBLICATIONS

PCT International Search Report for PCT/US2013/027842, mailing date Aug. 1, 2013.

* cited by examiner

*Primary Examiner* — Edward Johnson
(74) *Attorney, Agent, or Firm* — Arthur E Gooding (57) ABSTRACT

A process for a continuous regeneration of a catalyst wherein the regeneration section includes at least two separate zones. The regeneration includes an upper combustion zone, and an lower combustion zone, where the process utilizes at least two independent regeneration gas loops for control of the amount of oxygen to regenerate the catalyst. The upper combustion zone can be divided into multiple zones, and the combustion zone can be divided into multiple zones.

18 Claims, 4 Drawing Sheets

ROBUSTNESS OF COKE BURNING FROM CATALYST FOR LIGHT PARAFFIN DEHYDROGENATION PROCESS

FIELD OF THE INVENTION

The present invention relates to processes for the conversion of a hydrocarbon feedstream to useful hydrocarbon products. In particular, the invention relates to the continuous regeneration of spent catalyst for reuse in the hydrocarbon conversion process.

BACKGROUND OF THE INVENTION

Hydrocarbons, and in particular petroleum, are produced from the ground as a mixture. This mixture is converted to useful products through separation and processing of the streams in reactors. The conversion of the hydrocarbon streams to useful products is often through a catalytic process in a reactor. The catalysts can be solid or liquid, and can comprise catalytic materials on a support. In particular, catalytic metals on a solid support are extensively used. The catalytic metals include platinum group metals, as well as other metals. During the processing of the hydrocarbons, the catalysts deactivate over time. One primary cause of deactivation is the formation and buildup of coke on the catalyst. The accumulation of coke blocks access to catalytic sites on the catalyst, and access to pores within the catalyst. The regeneration of the catalyst is normally performed through the removal of the coke, where the coke is combusted at a high-temperature with a gas having oxygen. These processes can be performed either in a continuous manner with the catalyst cycled through the reactor and the regenerator, or the process can be performed in a semi-continuous manner, such as with multiple fixed beds, where one bed is taken off stream to regenerate the catalyst, while the other beds continue operation.

With the continuous regeneration process, a recycle gas is continuously passed to the combustion zone in the regenerator and a flue gas containing the combustion products is removed. The combustion process is controlled through the oxygen content in the recycle gas. The recycle gas stream comprises a portion of the flue gas, and an additional stream of new combustion gas, while venting another portion of the flue gas from the regenerator. This helps maintain the temperature of the combustion gas, as well as setting up a steady state condition of continuous addition of spent catalyst and combustion gas to the regenerator, while continuously drawing regenerated catalyst and flue gas.

Catalyst regeneration methods are disclosed in U.S. Pat. No. 5,053,371 to Williamson, and U.S. Pat. No. 6,048,814 to Capelle, et al. for removing coke from catalyst particles through combustion. The combustion process can be damaging to the catalyst, and better methods of control of the combustion process are important for improving the life of the catalyst in the reactor-regenerator cycle. Producing a better process allows for more cycles of the catalyst through the regenerator, and increases the life of the catalyst. This can be achieved through improvements in the process and control of the regenerator.

SUMMARY OF THE INVENTION

The present invention provides an improved process for the regeneration of a dehydrogenation catalyst. The process includes passing a spent catalyst stream to a first stage in a regenerator reactor. The regenerator has an upper burn zone, and a lower burn zone. The catalyst is treated at a first set of combustion conditions with a first regeneration gas, within the first stage, and thereby generating an intermediate catalyst stream. The intermediate catalyst stream is passed to a second stage in the regenerator, where the catalyst is treated at a second set of combustion conditions with a first portion of a second regeneration gas, and thereby generating a second intermediate catalyst stream. The second intermediate catalyst stream is passed to a third stage in the regenerator, where the catalyst is treated at a third set of combustion conditions with a second portion of the second regeneration gas, thereby generating a regenerated catalyst stream. The first stage is in the upper burn zone, and the second and third stages are in the lower burn zone.

The combustion conditions include having an oxygen concentration in the second regeneration gas at a concentration greater than the oxygen concentration in the first regeneration gas, where the first regeneration gas and the second regeneration gas are on independent loops, with separate equipment.

The second and third stages in the lower burn zone can have different gas inlet temperatures, with the preferred conditions of the second stage receiving the first portion of the second regeneration gas at a temperature greater than the temperature in the second portion of the second regeneration gas passed to the third stage.

Other objects, advantages and applications of the present invention will become apparent to those skilled in the art from the following detailed description and drawings.

DETAILED DESCRIPTION OF THE INVENTION

Improving the catalyst regeneration process allows for smaller equipment, or for more catalyst to be processed in a shorter time within existing equipment. The improvement of catalyst regeneration includes greater removal of coke, and can increase the life of the catalyst between regeneration cycles through a greater removal of coke from the catalyst.

The present invention is a process for the continuous regeneration of a catalyst, and includes new equipment designs for the new process. The most common application is the removal of coke from catalyst particles that contain a metal from the platinum group, and the most common process for this invention is the catalytic dehydrogenation process of paraffins to olefins. The regenerator in the olefin conversion process is described in U.S. Pat. No. 7,585,803, issued to Price, et al. on Sep. 8, 2009, and is incorporated here by reference in its entirety.

One regenerator design includes two zones in the total combustion zone, but with a single gas circulation loop. These are an upper combustion zone and a lower combustion zone. With this design the maximum oxygen concentration in the lower zone is limited by the overall oxygen consumption and percentage of the lower zone in the total combustion zone. Typically, this means the maximum oxygen concentration in the lower combustion zone is about 2% with a split of the combustion gas of 70% to the upper combustion zone and 30% to the lower combustion zone. The process can be made more robust and it is desired to provide for an increase in the oxygen concentration to the lower combustion zone. A preferred level would be to increase the oxygen concentration to 5% by volume of the combustion gas in the lower combustion zone. As used hereinafter, the combustion zone may be referred to as the burn zone, and the terms are meant to be interchangeable.

Analysis of the coke produced during light olefin dehydrogenation, and kinetic modeling of the reactions in a catalyst regenerator enabled the development of improvements in the two blower design. It was found to be advantageous to have an upper burn zone, or first stage, operated at conventional combustion conditions, and a lower burn zone, or second stage, operated at combustion conditions with a higher oxygen concentration and/or temperature. In addition, it was found to be advantageous to have the second stage with a residence time greater than or equal to the residence time of the first stage. It was also found that there were advantages to subdividing the two zones into substages, wherein the temperatures of the inlet regeneration gas stream to each substage can be varied.

The objective of these changes to the regenerator design and operation is to increase the burning capacity in the regenerator, and to provide for flexible design to enable the efficient burning of different coke formations and coke accumulations on the catalyst. One aspect to be considered is the amount of hard to burn coke formed, where the diffusion of oxygen may be the primary limitation or the composition of the coke is sufficiently different from easier to burn coke compounds to significantly alter the rate of burning and therefore regeneration. The ability to elevate the inlet gas temperature after the soft coke has been burned improves the burning of the hard, or diffusion limited, coke.

In a design with a single gas circulation loop, the portions of the recycle gas which are enhanced with additional oxygen, or oxygen containing gas, and introduced to the lower combustion zone pass through the upper combustion zone without being depleted of oxygen. This results in increasing the oxygen concentration in the overall recycle gas exiting the regeneration vessel to a relatively high level to the upper combustion zone. This relatively high level of oxygen is intolerable for appropriate control of combustion in the upper combustion zone. This requires additional dilution gas that is introduced to the upper combustion zone in order to reduce the oxygen concentration in the upper combustion zone. A consequence is an increase in recycle gas, flue gas venting, and utilities usage. Separating these two recycle gas streams provides more control and flexibility.

The present invention is designed to improve the control and improve the regeneration of the catalyst. The process includes passing a spent catalyst stream to a regenerator, where the regenerator includes an upper regeneration zone, and a lower regeneration zone. The catalyst enters the upper combustion zone and passes through to the lower combustion zone. A first regeneration gas stream is passed to the upper regeneration zone to combust the coke on the catalyst, and generates a combustion flue gas that is removed from the regenerator. The spent catalyst is partially regenerated in the upper regeneration zone and is passed as a partially regenerated catalyst stream to the lower regeneration zone. A second regeneration gas stream is passed to the lower regeneration zone, to create a regenerated catalyst stream. The first and second regeneration gas streams are independent streams to provide control over the amount of oxygen in each stream and to control the combustion in each combustion zone.

Figure 1:
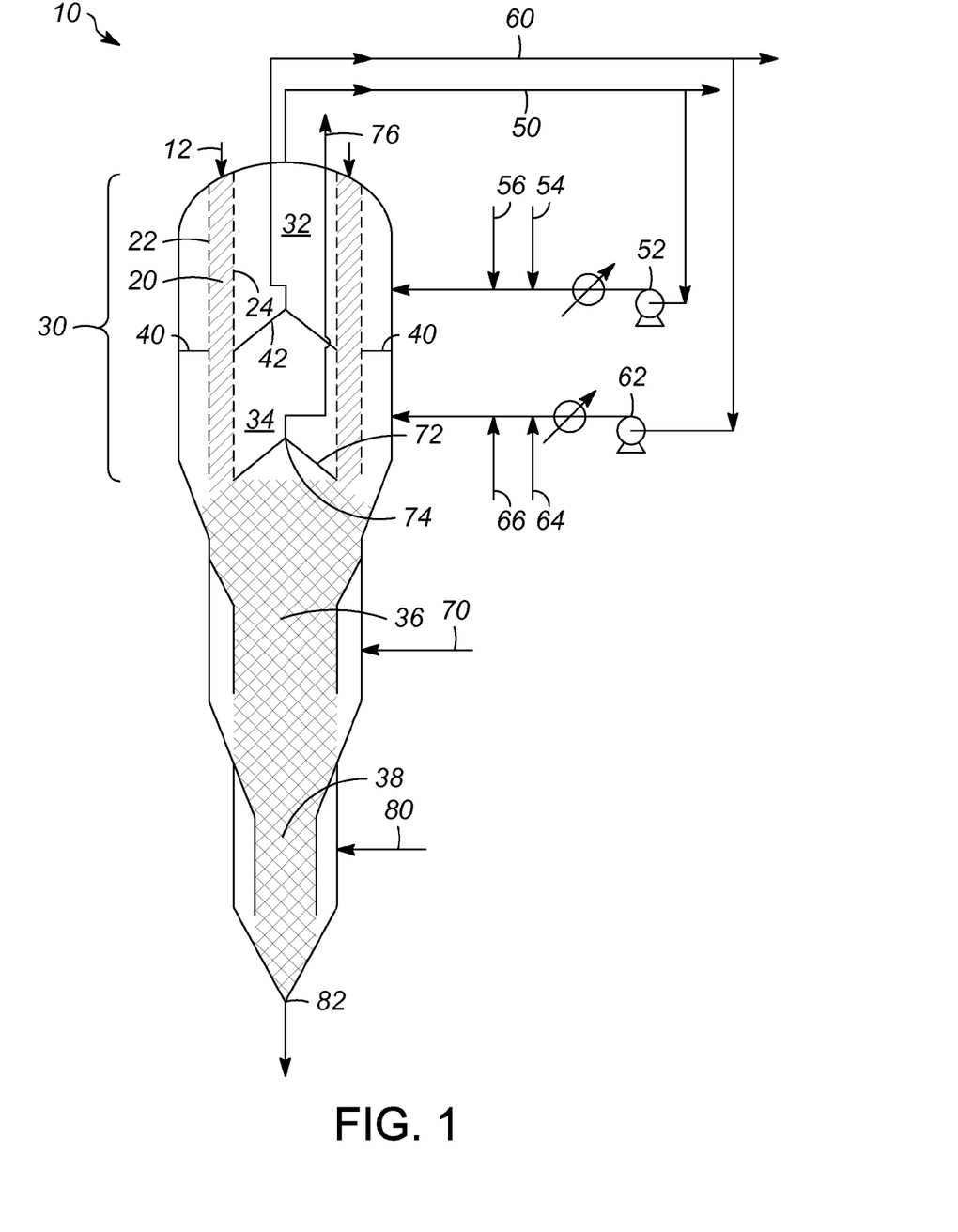
FIG. 1 is an illustration of the regeneration zone and the circulating oxidizing gas streams for regeneration of catalyst flowing through the regenerator having an upper burn zone and a lower burn zone.

The process is further described with respect to the FIG. 1, where an initial improvement was found with the separation of the recycle gas into two separate and independent regeneration gas streams. This decoupled the maximum oxygen concentration in the lower zone from limits based upon desired oxygen concentrations in the upper zone. A stream of spent catalyst particles 12 is continuously introduced to a regenerator 10. Although the term continuous is applied to this process herein, the process is more of a semi-continuous process where small amounts of catalyst are withdrawn from the reactor and passed to the regenerator on a relatively continuous basis. The catalyst particles flow downward through an annular region 20 defined by retention screens 22, 24 and which is located in the combustion zone 30. The combustion zone 30 is divided into an upper combustion zone 32 and a lower combustion zone 34. The upper combustion zone 32 is separated from the lower combustion zone 34 by baffles 40 and a separate lower flue gas collection device 42. As catalyst particles flow down through the upper combustion zone 32, a first regeneration gas is contacted with the catalyst particles to combust the carbon on the catalyst particles. The catalyst particles flow through the upper regeneration zone slowly to provide sufficient time for the carbon to be combusted. The catalyst will have an average residence time in the upper zone between 1 and 6 hours, with a preferred time between 2 and 5 hours, and with a more preferred time between 3 and 4 hours.

The first regeneration gas is cycled through a first regeneration gas loop 50 using a first gas blower 52 for circulation of the regeneration gas, where flue gas from the upper, or first, combustion zone 32 is passed into the first regeneration gas loop 50. The flue gas is made up of carbon monoxide, carbon dioxide, water, nitrogen, unreacted oxygen and other gases generated in the combustion section or introduced with the oxygen containing gas 54 and withdrawn from the regeneration zone as flue gas. The regeneration gas is flue gas that forms a recycle gas loop wherein the flue gas stream is continually withdrawn from the process and is admixed with an oxygen-containing gas 54 to replenish consumed oxygen and returned to the initial combustion section as the first regeneration gas. In one embodiment, the oxygen containing gas may be supplied via one of the zones having higher oxygen concentrations within the regenerator, zones 34 or 36. A portion of the flue gas is vented to maintain a continuous steady flow of regeneration gas. The flue gas is heated or cooled as needed to achieve the desired combustion temperature before passing to the upper combustion zone as the first regeneration gas stream. The first combustion temperature is between 450° C. and 600° C., with a preferable temperature between 470° C. and 580° C., with a more preferred temperature between 475° C. and 560° C., and with an operational control of the temperature in the neighborhood of 477° C. Oxygen 54 is added to the regeneration gas stream to a level of between 0.1% and 2% by volume, with a preferred range of 0.2% to 1.7% by volume, and with a more preferred range of 0.5% to 1.5% by volume. The regeneration gas comprising recycled gas with additional oxygen is passed to the upper combustion zone. The oxygen level is monitored in the recycle gas and additional oxygen is added as needed to bring the oxygen levels to within desired ranges. The level of oxygen is needed to control the combustion and to prevent damage to the catalyst. Optionally, additional control on the gas composition includes a nitrogen gas stream 56 to add as a diluent should the oxygen levels need further control. In an alternative, the oxygen containing gas can be mixed with the nitrogen before adding the gas stream to the first regeneration gas stream.

The upper combustion zone is frequently unable to combust all of the carbon deposited on the catalyst. The present invention includes a lower combustion zone 34 where a separate regeneration gas is used to complete the combustion process and to burn off the residual carbon on the catalyst.

The catalyst is further processed and flows from the upper combustion zone 32 to the lower combustion zone 34, where the catalyst is contacted with a second regeneration gas stream for removing the residual carbon. The lower combustion zone is also referred to as the lower burn zone. The second regeneration gas is cycled through a second regeneration gas loop 60 using a second gas blower 62 for circulation of the regeneration gas, where flue gas from the lower, or second, combustion zone 34 is passed into the second regeneration gas loop 60. The flue gas is made up of carbon monoxide, carbon dioxide, water, nitrogen, unreacted oxygen and other gases generated in the combustion section or introduced with the oxygen containing gas and withdrawn from the regeneration zone as flue gas through a separate loop flue gas collection device 42. The second regeneration gas is flue gas that forms a second recycle gas loop 60 wherein the flue gas stream is continually withdrawn from the process and is admixed with an oxygen-containing gas 64 to replenish consumed oxygen and returned to the lower combustion section as the second regeneration gas. A portion of the flue gas is vented to maintain a continuous steady flow of the second regeneration gas. The flue gas is heated to a second combustion temperature before passing to the lower combustion zone. The second combustion temperature is between 450° C. and 600° C., with a preferable temperature between 470° C. and 580° C., and with a more preferable temperature between 475° C. and 560° C., with an operational control of the temperature in the neighborhood of 520° C. to 560° C. Optionally, additional control on the gas composition includes a nitrogen gas stream 66 to add as a diluent should the oxygen levels need further control. Stream 66 is not limited to pure nitrogen, but stream 66 may be any nitrogen containing gas having an oxygen concentration less than the desired inlet oxygen concentration to the lower burn zone 34. In an alternative, the oxygen containing gas can be mixed with the nitrogen before adding the gas stream to the second regeneration gas stream. In yet another alternative, the oxygen containing gas may be supplied via zone 36.

The lower combustion zone, is operated and sized to allow for the catalyst to reside in the lower zone between 1 and 6 hours, with a preferred average residence time between 2 hours and 5 hours, and with a more preferred average residence time between 3 and 4 hours. The oxygen concentration in the lower combustion zone is greater than for the upper combustion zone, and is controlled to a level between 0.1% and 10% by volume, preferably between 0.2% and 7% by volume, and more preferably between 0.5% and 5% by volume.

After the removal of carbon from the catalyst, the catalyst is further processed to redistribute the catalytic metal over the support. The combustion process while removing the carbon from the catalyst also causes agglomeration of the metal in the catalyst particles. This would make the catalyst less effective and would reduce the life of the catalyst. The metal in the catalyst particles can be redistributed over the catalyst surface through contact with a halogen containing gas. Therefore, catalyst particles exiting the lower combustion zone 34, are passed to a halogenation zone 36. The halogenation zone 36 is preferably in the same vessel to minimize external handling, as well as minimize the amount of heating and cooling of the catalyst during transfer between vessels. A halogen containing gas is admitted to the halogenation zone 36 through an inlet to a halogenation gas loop 70. The halogen containing gas contacts the catalyst and redistributes the catalytic metal on the catalyst surface. The gas flows upward through the halogenation zone 36, and is collected at a halogenation gas collection device 72. The halogenation collection device 72 has an outlet 74 affixed to a halogen gas circulation pipe 76. The halogen circulation system can include a separate blower for circulating the gas, as well as appropriate driers for removing moisture and adsorbent beds for removing residual contaminants from the catalyst as the catalyst flows through the halogenation zone 36. A preferred halogen containing gas includes chlorine in the gas as the active halogen.

Following regeneration, the catalyst is dried. The combustion process generates water as one of the combustion products and the water can be adsorbed onto the regenerated catalyst. The presence of water adversely affects the dehydrogenation process and needs to be removed before the catalyst is returned to the reactor. In one embodiment, the catalyst drying is performed in the regenerator 10. The catalyst flows from the halogenation zone 36 to a drying zone 38. A drying gas 80 is passed into the drying zone 38 and flows over the regenerated catalyst to remove any residual water. The drying gas is heated to a temperature between 390° C. and 510° C. before passing into the drying zone 38. The drying gas is distributed around the drying zone 38 and flows up through the catalyst passing down through the drying zone 38. The duration for drying is largely governed by the height of the zone 38. The zone is sized to provide for an average residence time of at least 4 hours for the catalyst particles. The drying gas flows up through the drying zone 38 and the halogenations zone 36 and is passed out of the regenerator through the outlet 74. The dried and regenerated catalyst is withdrawn through the catalyst outlet 82 at the bottom of the regenerator 10.

Figure 2:
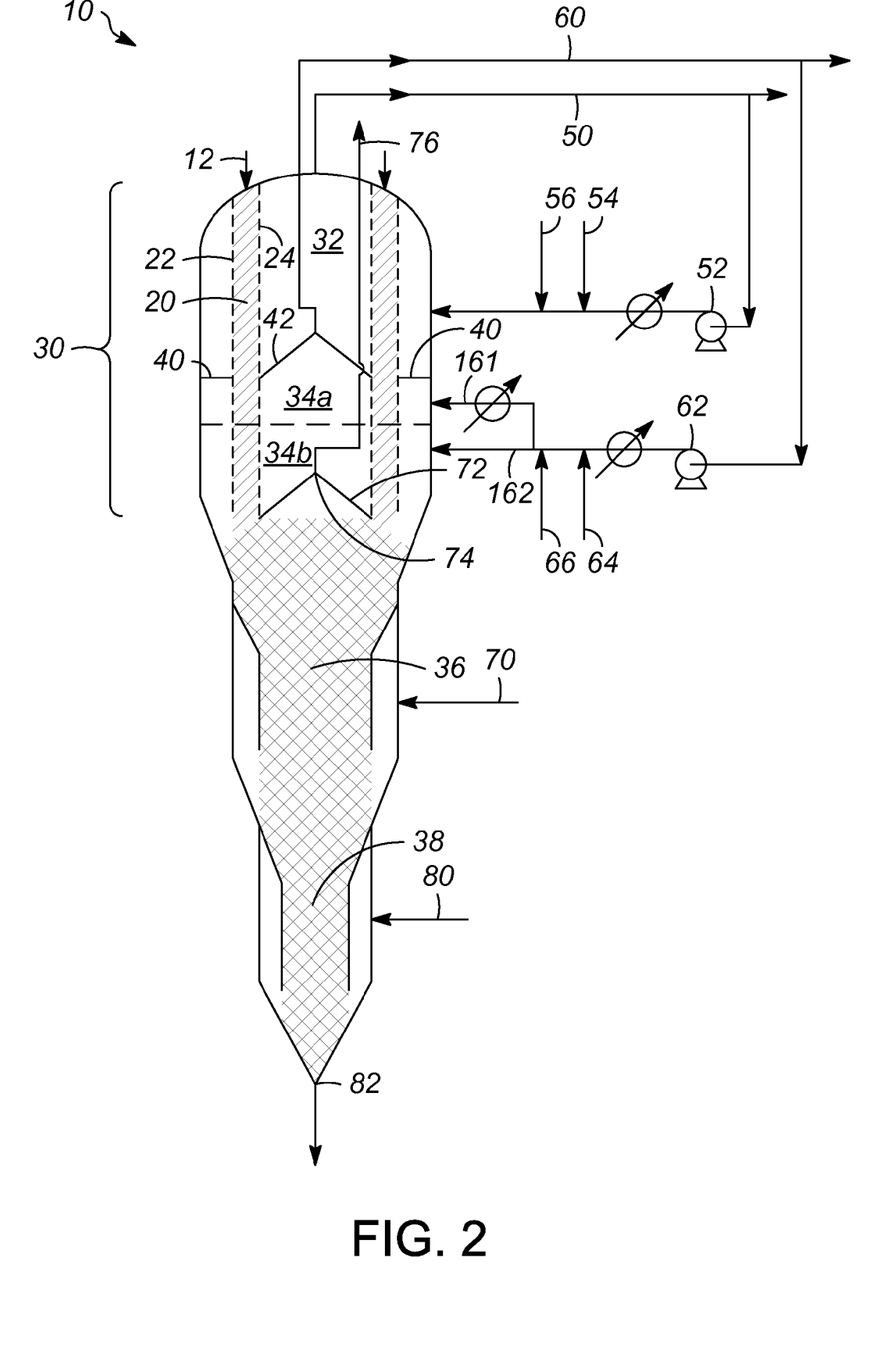
FIG. 2 is an illustration of the regeneration zone and the circulating oxidizing gas streams for regeneration of catalyst flowing through the regenerator having an upper burn zone and a lower burn zone, with the lower burn zone having two substages.

The process can be further improved with the lower stage, or lower burn zone, split into two stages for combustion. This is illustrated in FIG. 2. Like numbers are used for like components for the different embodiments in all the Figures. The process is as described above for much of the invention, with the improvement of expanding the control over the combustion. In the process a stream of spent catalyst particles 12 is continuously introduced to a regenerator 10. Although the term continuous is applied to this process herein, the process is more of a semi-continuous process where small amounts of catalyst are withdrawn from the reactor and passed to the regenerator on a relatively continuous basis. The catalyst particles flow downward through an annular region 20 defined by retention screens 22, 24 and which is located in the combustion zone 30. The combustion zone 30 is divided into a first stage 32, or an upper combustion zone 32, a second stage 34a, and a third stage 34b. The second and third stages 34a, 34b are also part of the lower burn zone. The first stage 32 is separated from the second stage 34a by baffles 40 and a separate lower flue gas collection device 42.

The catalyst entering the first stage is contacted with a first regeneration gas stream from the first regeneration gas loop 50 including makeup oxygen from an oxygen containing gas stream 54, and reacted at a first set of combustion conditions to generate a first intermediate catalyst stream. The first intermediate catalyst stream passes to the second stage 34a where the catalyst is contacted with a first portion of a second regeneration gas stream at a second set of combustion conditions to generate a second intermediate catalyst stream. The second regeneration gas is from the second regeneration gas loop 60 and the first portion is passed to the second stage 34a through line 161. The second regeneration gas includes added oxygen from an oxygen containing gas 64. The second intermediate catalyst stream is passed to the third stage 34b where the catalyst is contacted with a second portion of the second recycle gas stream entering through line 162 at a third set of combustion conditions to generate a regenerated catalyst stream. The first regeneration gas stream and the second regeneration gas stream are independent, and have separate oxygen concentrations for efficient control of the regeneration stages. It is well understood that the gas loops 50, 60 may contain one or more heaters or coolers to achieve the desired temperatures in each of the zones while minimizing utility usage. The heaters and/or coolers may be positioned as needed on any of the circulating gas streams upstream or downstream of the blowers and splits to form streams 161 and 162.

The regenerated catalyst stream is passed to a halogenation zone for a redistribution of the catalytic metal on the surface of the catalyst.

The first set of combustion conditions in the first stage 32 include the first regeneration gas entering the first stage at a temperature between 460° C. and 600° C., with a preferred temperature between 470° C. and 580° C., with a more preferred feed temperature between 475° C. and 560° C., and a most preferred feed temperature between 475° C. and 485° C.

The second set of combustion conditions in the second 34a and third 34b stages includes the second regeneration gas entering the second and third stages at a temperature between 450° C. and 600° C., with a preferred temperature between 470° C. and 580° C., with a more preferred feed temperature between 475° C. and 560° C., and a most preferred feed temperature between 520° C. and 560° C. The splitting of the second regeneration gas to two inlets provides further control where a regeneration gas richer in oxygen is still available to catalyst that has been mostly regenerated.

The control of the process includes controlling the temperatures in the different zones, or stages, and the process conditions preferably include maintaining the first stage regeneration gas inlet temperature to a temperature below the second regeneration gas entering the second stage. A further control of the process includes operating the inlet gas temperature to the second stage at a temperature greater than or equal to the inlet gas temperature to the third stage. A further part of the control of the regeneration process includes the residence times for the different stages. In the present invention, the residence time of the catalyst for the upper combustion zone 32 is less than or equal to the residence for the lower combustion zone 34a, 34b. The can be restated as the first stage 32 residence time is less than or equal to the sum of the second 34a and third 34b stage residence times.

The first set of combustion conditions includes the first regeneration gas having an oxygen content less than 2% by volume. A preferred range of the oxygen content for the first regeneration gas is between 0.1% to 2% by volume, with a more preferred range between 0.2% and 1.75% by volume, with a most preferred range between 0.4% and 1.5% by volume.

The second set of combustion conditions includes passing the second regeneration gas having an oxygen content of at most 10% by volume. The range is from 0.1% to 10% by volume, with a preferred range from 0.2% to 7% by volume, a more preferred range from 0.5% to 5% by volume, and a most preferred range from 1% to 5% by volume.

The processing conditions can include the oxygen concentration in the first recycle gas stream entering the upper combustion zone 32 at a concentration less than the oxygen concentration in the second recycle gas stream entering the lower combustion zone 34.

Figure 3:
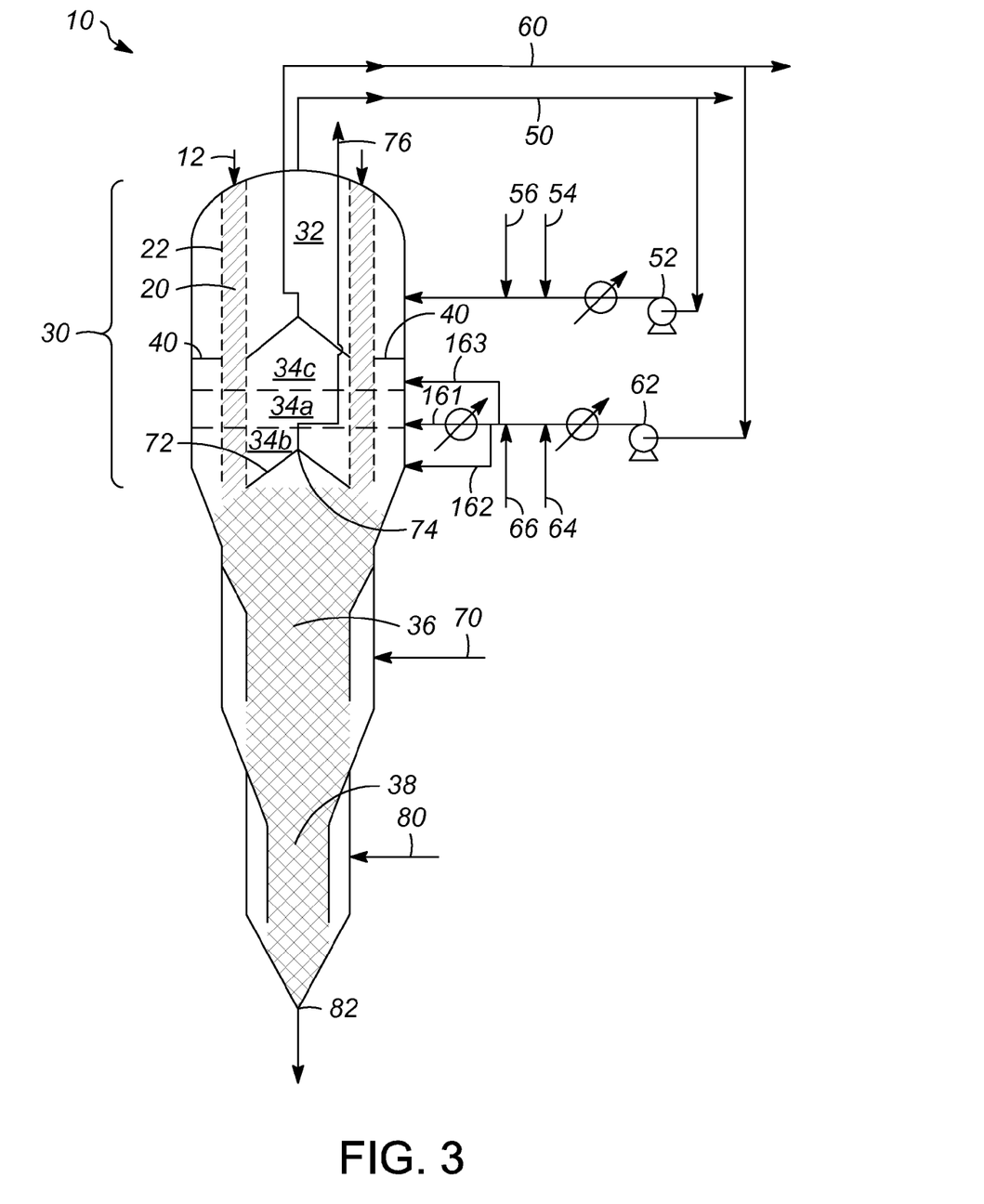
FIG. 3 is an illustration of the regeneration zone and the circulating oxidizing gas streams for regeneration of catalyst flowing through the regenerator having an upper burn zone and a lower burn zone, with the lower burn zone having three substages.

In an alternate embodiment, the process can include additional stages to the regenerator. In one embodiment, as shown in FIG. 3, a fourth stage 34c is included in the combustion section 30. The fourth stage 34c is located in the lower combustion zone, or the lower burn zone, and is between the first stage 32 and the second stage 34a. The fourth stage is operated at a fourth set of combustion conditions which includes a fourth inlet temperature for the regeneration gas. The second 34a, third 34b, and fourth 34c stages use regeneration gas from the second gas loop 60. The second regeneration gas is split into three portions with a first portion 161 passed to the second stage 34a, a second portion 162 passed to the third stage 34b, and a third portion 163 passed to the fourth stage 34c. The regeneration gas may be heated or cooled as required to achieve the desired temperatures of the regeneration gas entering each stage 34a, 34b and 34c in the lower combustion zone 34. It is understood that the placement of heaters and/or coolers in FIG. 3 is for illustration purposes and that the heaters and/or coolers may be positioned to minimize utility consumption in alternative embodiments.

The oxygen concentration in the second regeneration gas entering the lower burn zone 34, is substantially constant at the inlets for the second stage 34a, third stage 34b, and fourth stage 34c. The stages are sized such that the residence time of the catalyst in the first stage is less than or equal to the sum of the residence times in the second, third and fourth stages. In a preferred embodiment, the temperature of the second stage 34a is controlled at a higher temperature than the third and fourth stages 34b and 34c.

The process for regenerating a dehydrogenation catalyst includes passing a spent catalyst stream to a regenerator reactor having a first zone and a second zone. The spent catalyst enters the first stage and is treated to a first set of combustion conditions, including a first inlet gas temperature to generate an intermediate catalyst stream. The first stage combustion utilizes a first regeneration gas from a first independent gas stream where the gas stream has a separate gas loop, and flow is controlled by a first blower, and the oxygen content is independently controlled. The intermediate catalyst stream is passed to the second stage in the regenerator reactor, where the catalyst is treated to a second set of combustion conditions, including a second temperature, to generate a regenerated catalyst process stream. The second stage combustion utilizes a second regeneration gas from a second independent gas stream where the gas stream has a separate gas loop, and flow is controlled by a second blower, and the oxygen content is independently controlled, with an oxygen content greater than the first stage. The second set of combustion conditions includes at least two substages, where the second regeneration gas is divided into at least two portions, with a first portion passed to the first substage and a second portion passed to the second substage, with the first substage operated at a first substage inlet gas temperature and the second substage operated at a second substage inlet gas temperature.

In one embodiment, the temperature to the first substage of the second stage is greater than the temperature of the first stage. The first substage temperature of the second stage is preferred to be greater than the second substage temperature of the second stage. Thus a heat exchanger, or heating unit, is provided for heating the first portion of the second recycle gas stream admitted to the second stage of the regeneration unit. Alternatively, a cooler may be provided to achieve the desired inlet gas temperature to the second substage of the lower burn zone.

In an alternate embodiment, the process includes a third substage in the second stage of the regenerator. The third substage is operated at a third temperature which is less than or equal to the second substage temperature in the regenerator. The second regeneration gas is divided into three portions, with a first portion directed to the first substage, a second portion to the second substage, and a third portion to the third substage. The oxygen content in the second regeneration gas can be greater than or equal to the oxygen content in the first regeneration gas. In a preferred embodiment, the temperature of the inlet gas to the third substage will be less than the inlet gas temperature to the first substage, and the inlet gas temperature to the second substage will be less than or equal to the inlet gas temperature to the first substage. Equipment appropriate for heating and/or cooling the circulating gas stream or portions thereof may be provided in any combination as needed to achieve the desired inlet gas temperatures.

Figure 4:
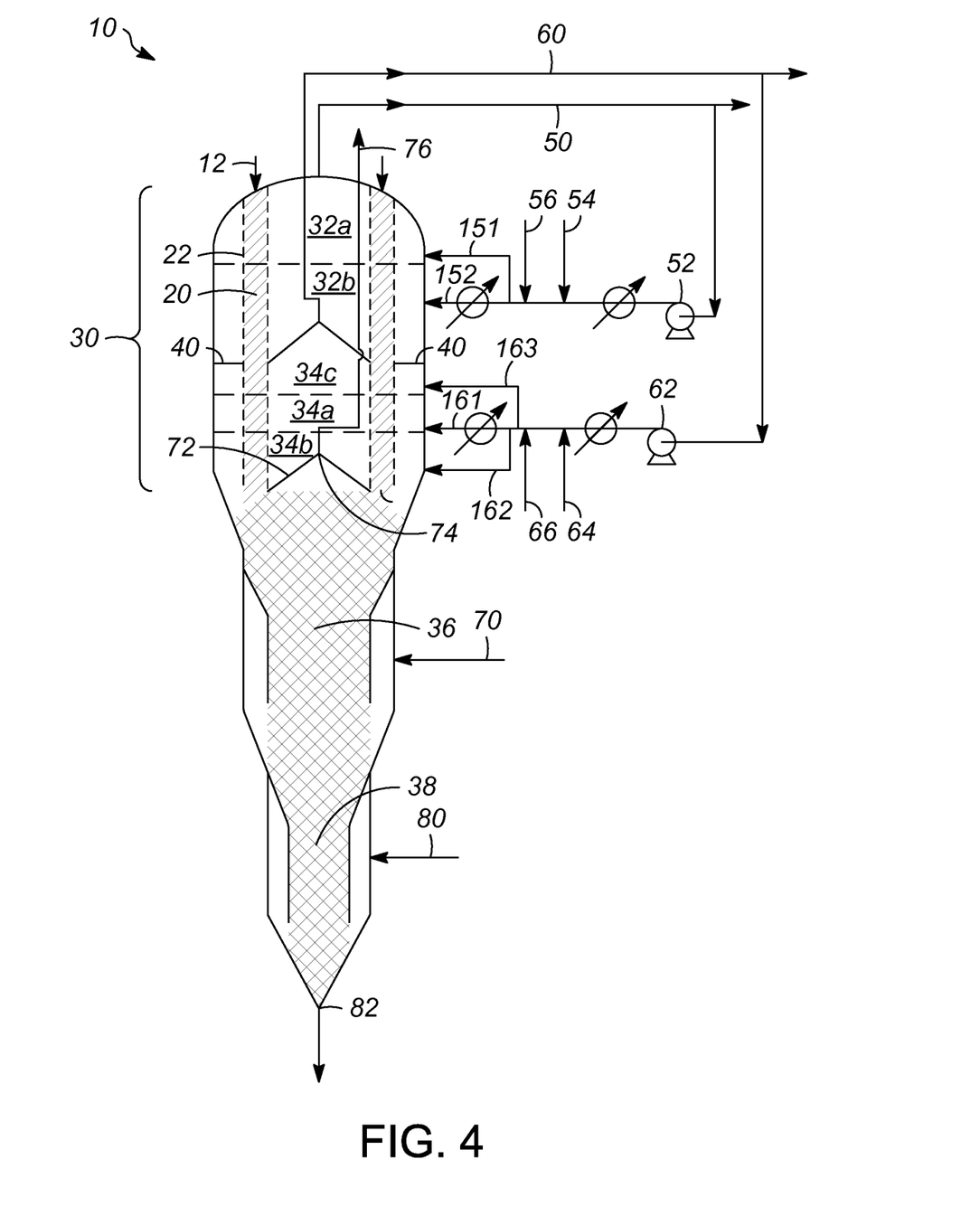
FIG. 4 is an illustration of the regeneration zone and the circulating oxidizing gas streams for regeneration of catalyst flowing through the regenerator having an upper burn zone and a lower burn zone, with the upper burn zone having two substages and the lower burn zone having three substages.

In a further alternate embodiment, the first stage of the regeneration unit can be subdivided into at least two substages. As shown in FIG. 4, the flow of the second regeneration gas is as described above for the embodiment presented in FIG. 2 and FIG. 3. This embodiment includes splitting the first regeneration gas, in the first regeneration gas loop 50, into at least two portions. A first portion 151 is passed to the first substage 32a in the first, or upper, stage of the regenerator. A second portion 152 is passed to the second substage 32b in the first stage of the regenerator. The second portion can be heated to an inlet temperature greater than the first portion inlet temperature. Alternatively, the first portion may be cooled to an inlet temperature less than the second portion inlet temperature.

The conditions for this embodiment include an oxygen concentration in the first regeneration gas less than or equal to the oxygen concentration in the second regeneration gas. The oxygen concentration in the first portion of the first regeneration gas is substantially equal to the oxygen concentration in the second portion of the first regeneration gas. The oxygen concentration in each of the inlets to the second stage substages is substantially the same at each substage inlet. The residence times of the catalyst in the first stage is less than or equal to the residence time of the catalyst in the second stage. The first stage residence time is the sum of the substage residence times of the first stage, and the second stage residence time is the sum of the substage residence times of the second stage.

In a preferred embodiment, with multiple substages of the two stages, where there are two substages in the first stage, or upper burn zone, and three substages in the second stage, or lower burn zone, the inlet gas temperature conditions include: first upper substage temperature less than the second upper substage temperature; and the first substage temperature in the lower stage, or lower burn zone, greater than the temperatures for the upper substages, and the second and third substages of the lower stage.

Therefore, increases can be achieved through innovative flow schemes and designs that allow for process control of the reactions. While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A process for regenerating a dehydrogenation catalyst comprising:
passing the catalyst to a first stage in a regenerator reactor, wherein the catalyst is treated to a first set of combustion conditions with a first regeneration gas stream within the first stage and generating an intermediate catalyst stream, wherein the first set of combustion conditions include passing the first regeneration gas having an inlet oxygen content of at most 2% by volume;
passing the intermediate catalyst stream to a second stage in the regenerator reactor, wherein the catalyst is treated to a second set of combustion conditions with a first portion of a second regeneration gas stream within the second stage and generating a second intermediate catalyst stream, wherein the second set of combustion conditions include passing the second regeneration gas having an oxygen content of at most 10% by volume, and wherein the average catalyst residence time is between 3 and 4 hours; and
passing the second intermediate catalyst stream to a third stage in the regenerator reactor, wherein the catalyst is treated to a third set of combustion conditions with a second portion of the second regeneration gas stream within the third stage and generating a regenerated catalyst stream,
wherein the first regeneration gas stream and the second regeneration gas stream are independent streams fed through independent gas lines.

2. The process of claim 1 further comprising passing the regenerated catalyst stream to a chlorination zone.

3. The process of claim 1 wherein the first set of combustion conditions include an inlet gas temperature between 450° C. and 600° C.

4. The process of claim 3 wherein the first set of combustion conditions include an inlet gas temperature between 470° C. and 580° C.

5. The process of claim 1 wherein the second set of combustion conditions include an inlet gas temperature between 450° C. and 600° C.

6. The process of claim 1 wherein the first set of combustion conditions includes a first inlet gas temperature, the second set of combustion conditions includes a second inlet gas temperature, wherein the first inlet gas temperature is less than or equal to the second inlet gas temperature.

7. The process of claim 1 wherein the second set of combustion conditions includes a second inlet gas temperature, the third set of combustion conditions includes a third inlet gas temperature, wherein the second inlet gas temperature is greater than or equal to the third inlet gas temperature.

8. The process of claim 1 further comprising a fourth stage in the regenerator, wherein the catalyst is treated to a fourth set of combustion conditions within the fourth stage.

9. The process of claim 8 wherein the fourth stage in the regenerator is disposed between the first stage and the second stage.

10. The process of claim 1 wherein the first set of combustion conditions includes an inlet oxygen concentration less than the inlet oxygen concentration in the second set of combustion conditions or the third set of combustion conditions.

11. The process of claim 1 further comprising a first residence time of the catalyst in the first stage, a second residence time of the catalyst in the second stage, and a third residence time of the catalyst in the third stage, wherein the first residence time is less than or equal to the sum of the second and third residence times.

12. The process of claim 1 wherein the first regeneration gas stream is passed to the upper regeneration zone using a first gas blower, and a first gas circulation loop, and wherein the second regeneration gas stream is passed to the lower regeneration zone using a second gas blower, and a second gas circulation loop.

13. A process for regenerating a dehydrogenation catalyst comprising:
> passing the catalyst to a first stage in a regenerator reactor, wherein the catalyst is treated to a first set of combustion conditions, including a first temperature, with a first regeneration gas within the first stage and generating an intermediate catalyst stream; and
>
> passing the intermediate catalyst stream to a second stage in the regenerator reactor, wherein the catalyst is treated to a second set of combustion conditions, including a second temperature, with a second regeneration gas within the second stage and generating a second intermediate catalyst stream, and where the second stage is divided into at least two substages, with a first substage and a second substage, and the second regeneration gas stream is divided into two portions with a first portion passed to the first substage and a second portion is passed to the second substage, and the first substage is operated at a first substage temperature and the second substage is operated at a second substage temperature, wherein the second set of combustion conditions include passing the second regeneration gas having an oxygen content of at most 10% by volume, and wherein the average catalyst residence time in the second stage is between 3 and 4 hours;
>
> wherein the first and second regeneration gas streams are independent streams fed through independent gas lines.

14. The process of claim 13 wherein the first substage temperature is greater than the first temperature.

15. The process of claim 13 wherein the first substage temperature is greater than the second substage temperature.

16. The process of claim 13 wherein the second stage in the regenerator reactor includes a third substage, operated at a third substage temperature, and where the second regeneration gas is divided into three portions with a first portion directed to the first substage, a second portion directed to the second substage, and a third portion directed to the third substage.

17. The process of claim 16 wherein the first portion of the second regeneration gas is heated to a temperature greater than the second portion, or the third portion.

18. The process of claim 13 further comprising splitting the first regeneration gas into two portions, with the first stage split into two substages, and passing a first portion of the first regeneration gas to a first substage, and a second portion of the regeneration gas to a second substage.

* * * * *